United States Patent
Jokinen

(12) 
(10) Patent No.: US 6,502,346 B1
(45) Date of Patent: Jan. 7, 2003

(54) SPRING TRAP SETTING DEVICE

(76) Inventor: Maynard Arne Jokinen, 102 16th St., Cloquet, MN (US) 55720

( * ) Notice: Subject to any disclaimer, the term of this patent is extended or adjusted under 35 U.S.C. 154(b) by 0 days.

(21) Appl. No.: 09/576,593

(22) Filed: May 22, 2000

(51) Int. Cl.$^7$ ............................................. A01M 23/28
(52) U.S. Cl. .......................................................... 43/97
(58) Field of Search ................................ 43/58, 96, 97

(56) References Cited

U.S. PATENT DOCUMENTS

| | | | | |
|---|---|---|---|---|
| 2,471,804 A | * | 5/1949 | Wheeler | 43/96 |
| 3,411,234 A | | 11/1968 | Harrison | 43/97 |
| 3,462,872 A | * | 8/1969 | Hall et al. | 43/97 |
| 3,800,463 A | * | 4/1974 | Treadwell | 43/97 |
| 4,115,945 A | * | 9/1978 | Hession et al. | 43/97 |
| 4,245,424 A | | 1/1981 | Smith | 43/97 |
| 4,429,485 A | * | 2/1984 | Dubray | 43/97 |
| 6,038,809 A | * | 3/2000 | Dittrick | 43/97 |

* cited by examiner

*Primary Examiner*—Darren W. Ark
(74) *Attorney, Agent, or Firm*—Curtis Harr

(57) ABSTRACT

A spring trap setting device that is made up of a bar type mechanism that has an outer body which is typically a square shaped tubing having an open end with the other end being closed off by a perpendicularly mounted flat foot. The open end of the outer body tube allows the insertion of a square shaped plunger bar into it's interior. The exterior dimensions of the interior plunger bar are slightly smaller than the interior dimensions of the hollow outer body tube which allows the plunger bar to slide freely up and down through the length of the body tube. The interior plunger bar is equipped with a perpendicularly mounted flat foot at its terminal end that acts primarily as a handle used to move the plunger bar up and down. Both the plunger bar and the outer body are equipped with a spring hook. These hooks are orientated such that the V-shaped spring of a trap may be placed between the hooks and through the compression or downward motion of the interior plunger bar. The V-shaped spring of a wire frame trap may be compressed and easily set while allowing the user to use their own body weight or a downward compressing motion to set the trap safely, quickly and with minimal effort.

6 Claims, 3 Drawing Sheets

SPRING TRAP SETTING DEVICE

BACKGROUND OF THE INVENTION

The present invention relates to an improvement in a device to aid in the setting of animal traps. More specifically, to a device used to aid in the setting of spring biased wire framed animal traps.

In the past animal traps mainly consisted of jaw type traps that would trap an animal by grasping the animal about the foot or paw and holding the animal until such time as the trapper could remove the animal from the trap. Another type of trap that is commonly used today is a spring biased wire frame trap that is placed over a hole and typically snares an animal about the neck area quickly and humanly exterminating the animal. This type of trap is commonly referred to as a CONIBEAR trap.

One of the main downfalls of this type of wire frame or CONIBEAR trap is the difficulty in setting the trap, especially larger sizes used for bigger animals. The trap typically has two V-shaped springs, one on each side of the trap, that must be compressed and latched in order to set the trap. This can be extremely difficult, especially for users of less than average strength. Because of this, devices have been made to aid in the setting of these wire frame type traps. Once such device is disclosed in U.S. Pat. No. 3,800,463 issued to Treadwell. This patent discloses the use of an aid where the user places the device on one of the V-shaped springs and pulls upward on a plunger compressing the V-shaped spring so that it may be latched. The problem with this type of device is that the user must pull up on the plunger and away from the V-shaped spring in order to compress the spring. Often times, this may make it very difficult to hold the plunger in an upward position while reaching down and latching the V-shaped mechanism. Further, with traps of a larger size it may be very difficult and require a large amount of strength for a young or infirm user to hold the plunger in an up position while latching the V-shaped spring.

From the above discussion, it can be seen that it would be desirable to supply a device to aid in the setting of wire frame spring traps. This device should be designed to aid a young or infirm user in setting the trap by allowing the user to use one's own body weight to compress the V-shaped spring and safely and quickly latch the V-shaped spring with a minimal amount of strength or stress.

SUMMARY OF THE INVENTION

It is the primary objective of the present invention to provide a method by which a wire frame animal spring trap, such as a CONIBEAR trap, can be safely set by individuals of varying experience levels in a manner that ensures that the trap won't inadvertently close and injure their hands or other body parts.

It is an additional objective of the present invention to provide such a method of setting wire frame spring traps that will give the user a sturdy and positive feel during the setting operation that helps to ensure that each and every trap is set properly.

It is a further objective of the present invention to provide such a method of setting a wire frame spring trap that is very easy to use so that almost anyone can quickly and safely set a variety of different sized traps.

It is a still further objective of the present invention to provide a tool for the accomplishment of these objective which can be manufactured and sold relatively inexpensively enabling it to be economically available to a large number of potential users.

These objectives are accomplished by the use of the spring trap setting device that is made up of a bar-type mechanism which has an outer body that is typically a hollow round or square-shaped tube having one end open and the other being closed off by a perpendicularly mounted flat foot. The open end of the outer body tube allows the insertion of a typically solid round or square-shaped plunger bar into its interior. The exterior dimensions of the interior plunger bar are slightly smaller than the interior dimensions of the hollow outer body tube which allows the interior plunger bar to slide freely up and down through the length of the exterior body tube. The interior plunger bar is also equipped with a perpendicularly mounted flat foot at its terminal end that acts primarily as a handle used to work the plunger bar up and down during the operation of the present invention.

One of the exterior faces of the trap setter body contains an elongated slot that passes through from the outside surface of the tube to the inner opening and extends for most of its length. The purpose of this slot is to allow for the passage of the upper spring hook through the trap setter body. The upper spring hook is a relatively small bar that extends perpendicularly from the surface of the plunger bar for a short distance where it then makes a ninety degree turn towards the foot of the setter body upon which it continues for a distance that is approximately equal to the section which is perpendicular to the plunger. This forms a downwardly oriented hook (in relation to the body of the invention) that extends out through the setter body slot and that is capable of moving within the slot with any up and down movement that is imparted on the plunger. It should be noted at this time that during construction of the present device the elongated slot may pass all the way to the open end of the tube to allow for insertion of the plunger bar with the attached spring hook. This slot may then be welded closed in a variety of ways including through the use of washer welded unto the end of the bar to close off the slot so that the plunger bar may not be removed from the bar as the spring hook is trapped in the slot.

Conversely, another similar hook is located on one of the outer surfaces of the trap setter body. This lower spring hook is essentially identical in construction to the upper spring hook except that it is mounted to form an upwardly oriented hook. Additionally, it differs from the previous hook in that it is mounted to the outside of the setter body and stays stationary in relation to the movement of the plunger during the use of the present invention. The construction and orientation of these two hooks forms a device with a variable hook gap which can be manipulated in terms of the size or distance between the hook members through the raising or lowering of the plunger within the trap setter body.

The present invention is used in conjunction with a common wire frame animal spring trap to set the trap for its intended use in the trapping of small animals. A wire frame spring trap is essentially two wire frames that are pivotally joined at their horizontal center and bent around this frame pivot joint in a fashion which allows them to be oriented primarily in two parallel planes at a specified distance from one another. The wire frame trap is also equipped with a pair of spring members which each have a pair of retainer rings that encircle a portion of each end frame of the wire frames at the furthest point on those respective end frames from the centrally located frame pivots. As long as these spring members are uncompressed, the trap is held in the closed position and it is completely safe to handle.

The present invention is employed to set the wire frame spring trap by pulling the plunger of the invention up and placing a trap along side of the setter body and within the gap created between the lower and upper spring hooks. From here, one places the lower hook into the retainer ring of the spring member and the upper hook into the other retainer ring of that particular spring member. Once this is complete, the plunger of the present invention is depressed which compresses the spring member and forces the retainer rings towards the center and the frame pivot. When this is accomplished, the user locks the spring member in place by the use of the spring retainer hook and repeats this process on the other spring member located on the opposite side of the trap.

Once both spring members have been compressed and safely held in this compressed position by the use of the spring hooks, the two frames can be rotated around the frame pivots to form similar, but opposite, pairs of parallel frames to those in the open position. Having done this, the user then sets the trigger and notched trigger retainer, which serve to not only trigger the trap but also to hold it in the set position, and then releases the two retainer hooks holding the spring members in place. This places a relatively large amount of force on the two wire frames that are seeking to return them to their open position. This force is held in check by the placement of the notched trigger lock. When the trigger is disturbed, the force is released and the frames violently return to the open position and ensnare any animal within their span.

For a better understanding of the present invention reference should be made to the drawings and the description in which there are illustrated and described preferred embodiments of the present invention.

DESCRIPTION OF THE PREFERRED EMBODIMENT

Figure 1:
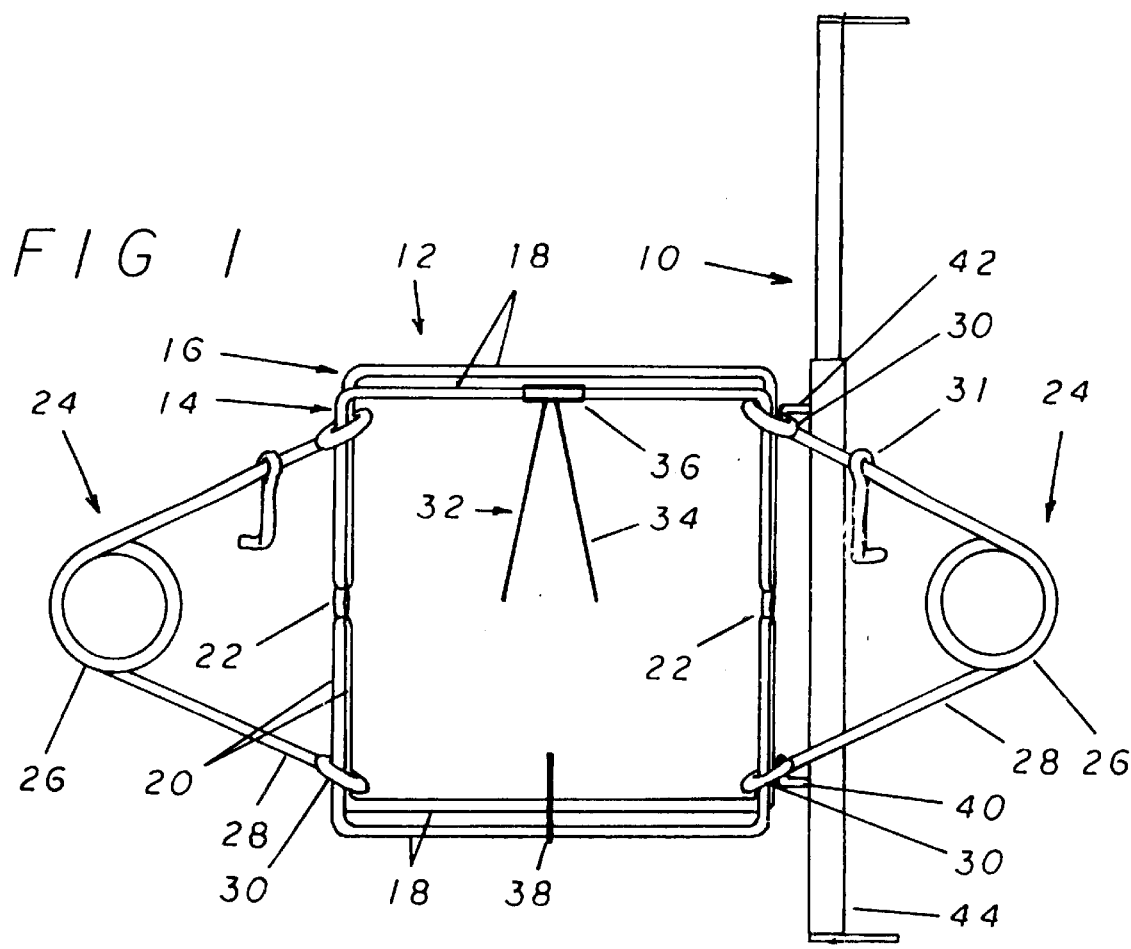
FIG. 1 is a perspective view of the present invention and a common spring-type animal trap which illustrates the manner in which it is employed to engage specific portions of a trap prior to its being set.

Referring now to the drawings, and more specifically to FIGS. 3, 4, 5, and 6, the spring trap setting device 10 is made up of a bar-type mechanism which has an outer trap setter body 44 that is typically a hollow round or square-shaped tube having one open end and the other being closed off by a perpendicularly mounted flat setter foot 46. The setter foot 46 provides a base for the present invention which can be placed.on the floor during the trap setting operation and held in place there by the operator's foot. This ensures that the present invention can be operated from a stable platform making the setting of a wire frame spring trap a safe operation.

The open end of the trap setter body 44 allows for the insertion of a solid square-shaped plunger bar 48 into its interior. The exterior dimensions of the plunger bar 48 are slightly smaller than the interior dimensions of the hollow trap setter body 44 which allows the interior plunger bar 48 to slide freely up and down through the length of the trap setter body 44 tube. The interior plunger bar 48 is also equipped with a perpendicularly mounted flat plunger handle 50 at its terminal end that provides the operator with a handle with which he can work the plunger bar up and down during the operation of the present invention.

One of the exterior surfaces of the trap setter body 44 also contains an elongated hook slot 52 that passes through from the outside surface of the trap setter body 44 to the inner opening and extends for most of its length. The purpose of the hook slot 52 is to allow for the passage of the upper spring hook 42 through the trap setter body 44. The upper spring hook 42 is a relatively small bar that extends perpendicularly from the surface of the plunger bar 48 for a short distance where it then makes a ninety degree turn towards the setter foot 46 of the trap setter body 44 upon which it continues for a distance that is approximately equal to the section which is perpendicular to the plunger bar 48. This forms a downwardly oriented hook (in relation to the body of the invention) that extends out through the hook slot 52 and that is capable of moving within the hook slot 52 with any up and down movement that is imparted on the plunger 48 by the operator through the plunger handle 50.

Another similar hook is located on one of the outer surfaces of the trap setter body 44. This lower spring hook 40 is essentially identical in construction to the upper spring hook 42 except that it is mounted to form an upwardly oriented hook. Additionally, it differs from the upper spring hook 42 in that it is mounted to the outside of the trap setter body 44 and stays stationary in relation to the movement of the plunger bar 48 during the use of the present invention. The construction and orientation of these two hooks forms a device with a variable hook gap which can be manipulated in terms of the size or distance between the hook members through the raising or lowering of the plunger bar 48 within the trap setter body 44. In this manner, the operator can manipulate the lower and upper spring hooks, 40 and 42, to grasp specific objects that are placed between them.

Figure 2:
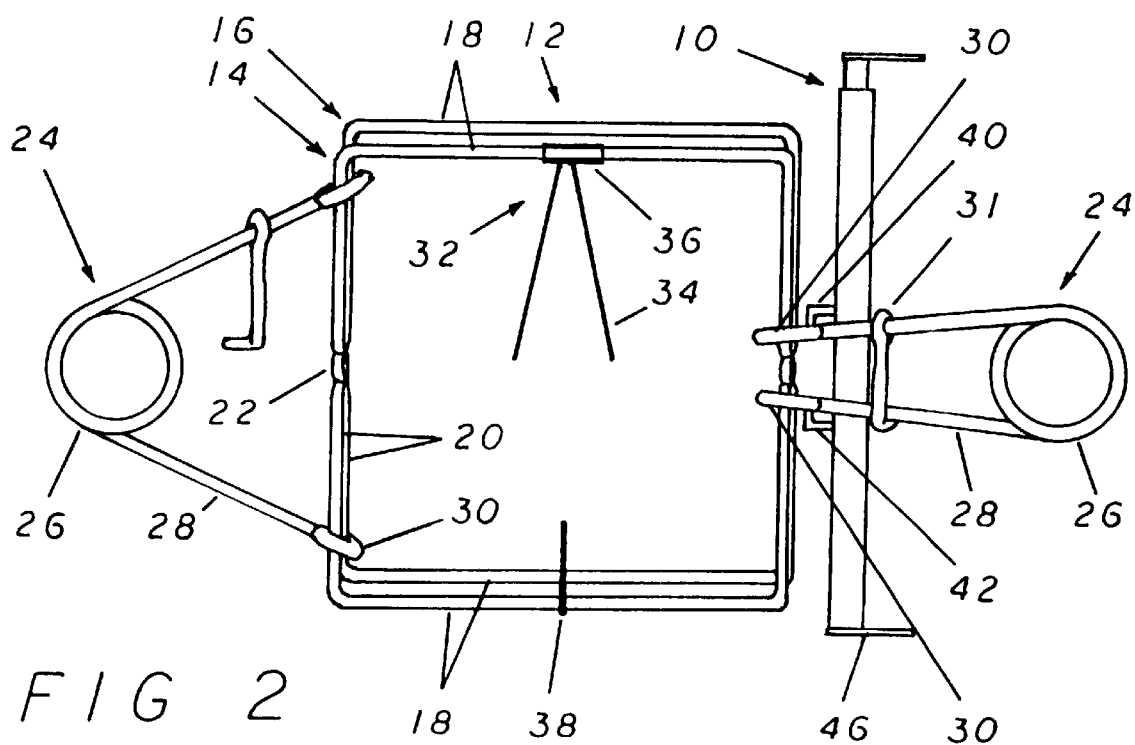
FIG. 2 is a perspective view of the present invention which illustrates the manner in which it is compresses the spring of the trap which allows the jaws of the trap to be opened and set for use.
Figure 3:
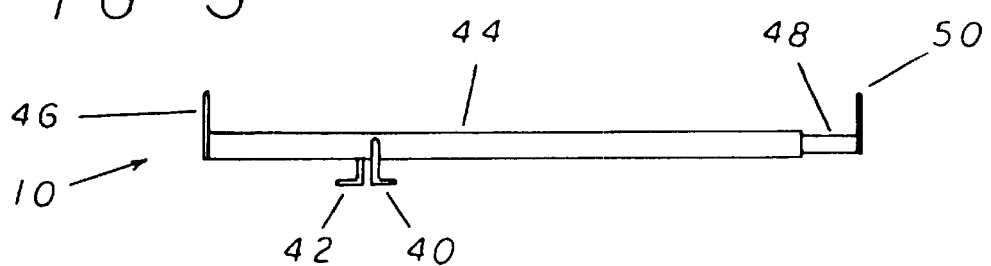
FIG. 3 is a side elevation view of the present invention illustrating the orientation of its major components in its collapsed configuration.
Figure 4:
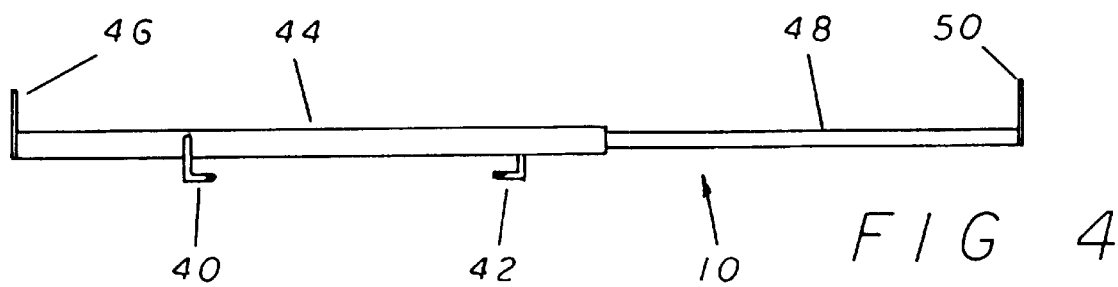
FIG. 4 is a side elevation view of the present invention illustrating the orientation of its major components in its expanded configuration.
Figure 5:
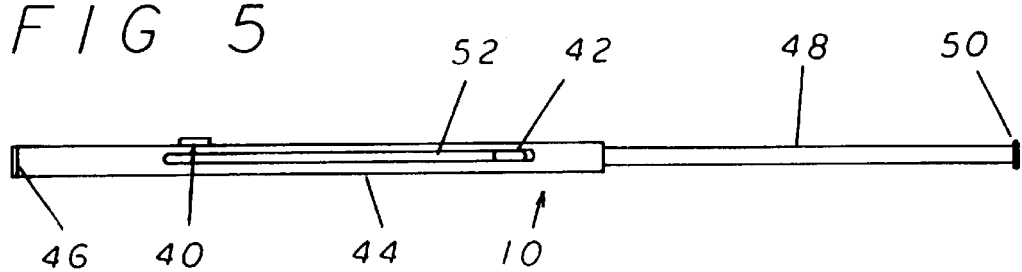
FIG. 5 is a top elevation view of the the present invention illustrating the orientation of its major components in its expanded configuration.
Figure 6:
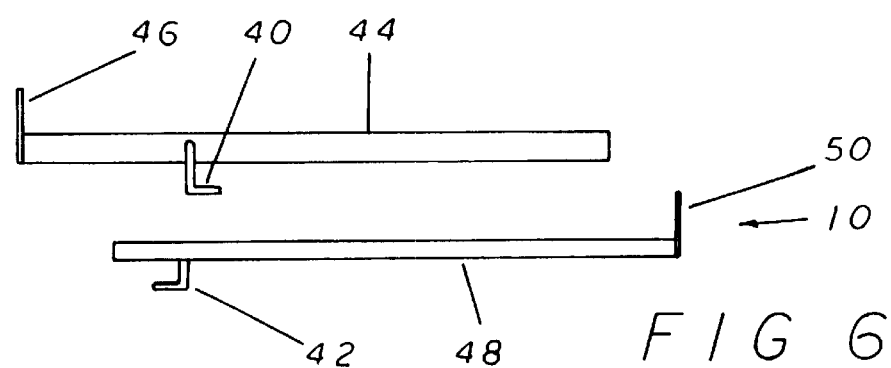
FIG. 6 is a side elevation view of the present invention illustrating the manner of construction of its two primary components.

As illustrated in FIGS. 1 and 2, the present invention is used in conjunction with a common wire frame animal spring trap 12 to set the spring trap 12 for its intended use in the trapping of small animals. A wire frame spring trap 12 is essentially two wire frames, the primary trap frame 14 and the secondary trap frame 16, which are pivotally joined at their horizontal center and bent around this frame pivot joint 22 in a fashion which allows them to be oriented primarily in two parallel planes at a specified distance from one another. The spring trap 12 is also equipped with a pair of spring members 24 which each have a pair of retainer rings 30 which encircle a portion of each frame end member 20 of the primary and secondary trap frames, 14 and 16, at the furthest point on those respective frame end members 20 from the centrally located frame pivots 22. As long as these spring members 24 are uncompressed, the trap 12 is held in the closed position with no pressure on the primary and secondary trap frames, 14 and 16, and in this orientation it is completely safe to handle.

Additionally, each of the primary and secondary trap frames, 14 and 16, are made up of a pair of frame end members 20 which are the portions of the trap frames, 14 and 16, within which the fame pivots 22 are positioned and also each terminal end of the frame end members 20 are spanned by the frame jaws 18 to complete the substantially square shape of the primary and secondary trap frames, 14 and 16. The frame jaws 18 are oriented in a plane that is parallel to the rotational axis created at the frame pivots 22 and maintain this orientation throughout the setting and closing operations of the spring trap 12. Additionally, it is the frame jaws 18 of the spring trap 12 which perform the function of grasping and holding any animal that has disturbed the trigger 32 of the spring trap 12.

The present invention is employed to set the wire frame spring trap 12 by pulling the plunger bar 48 of the invention up and placing a spring trap 12 along side of the trap setter body 44 and within the gap created between the lower and upper spring hooks, 40 and 42. From here, one places the lower spring hook 40 into the retainer ring 30 of the spring member 24 and the upper spring hook 42 into the other retainer ring 30 of that particular spring member 24. Once this is complete, the plunger bar 48 of the present invention is depressed which compresses the spring member 24 and forces the retainer rings 30 towards the center of the frame end members 20 and the frame pivot 22. The spring members 24 are made up of a circular spring member 26 which are positioned on either side of the primary and secondary trap frames, 14 and 16, and have a pair of spring arms 28 that extend towards the frame end members 20 and terminating at the retainer rings 30. When the spring members 24 are fully compressed, the user locks the spring member 24 in place by the use of the spring retainer hook 31 and repeats this process on the other spring member 24 located on the opposite side of the spring trap 12. The use of the spring retainer hooks 31 ensures that the frame jaws 18 will not unintendedly close on the user's fingers or hands during the setting operation which would be likely to cause a serious and painful injury.

Once both spring members 24 have been compressed and safely held in this compressed position by the use of the spring retainer hooks 31, the primary and secondary frames, 14 and 16, can be rotated around the frame pivots 22 to form similar, but opposite, pair of parallel frames to those of the spring trap 12 in the open position. Having done this, the user then sets the trigger 32 and notched trigger retainer 38, which serve to not only trigger the spring trap 12 but also to hold it in the set position, and then releases the two spring retainer hooks 31 holding the spring members 24 in place. The trigger is generally made up of a pair of trigger arms 34 that extend into the center of the spring trap 12 from the trigger mount 36 located on one of the frame jaws 18 of the primary trap frame 14.

The setting and the locking of the trigger 32 places a relatively large amount of force on the primary and secondary trap frames, 14 and 16, that is seeking to return them to their open position. This force is held in check by the placement of the notched trigger retainer 38. When the trigger 32 is disturbed, the force is released and the primary and secondary frames, 14 and 16, violently return to the closed position and the frame jaws 18 then ensnare any animal within their span.

Although the present invention has been described in considerable detail with reference to certain preferred versions thereof, other versions are possible. Therefore, the spirit and scope of the appended claims should not be limited to the description of the preferred versions contained herein.

What is claimed is:

1. A device for setting a spring biased trap, said device consisting of:
    an elongate hollow outer body having an open top end and a bottom end, said outer body defining an elongate slot along said outer body, said slot having an upper end closest to said open top end of said outer body and a lower end closest to said bottom end of said outer body;
    a first hook fixedly attached to said outer body in a position toward said bottom end of said outer body and said lower end of said slot, said first hook being open toward said open top of said outer body;
    a substantially flat setter foot fixedly attached to said bottom end of said hollow outer body and extending perpendicularly out from said hollow outer body;
    an elongate inner plunger having a top and a bottom end, said inner plunger slidably placed in said outer body and extending outward from said top end of said outer body;
    a second hook toward said bottom of said inner plunger such that said second hook extends out of said slot when said inner plunger is in said outer body such that said inner plunger is freely slidable between a first position wherein said second hook is at the upper end of said slot and a second position wherein said second hook is at the lower end of said slot, said second hook being fixedly attached to said inner plunger in a position toward said bottom end with said second hook being open toward said bottom end; and
    a handle fixedly attached to said top end of said inner plunger.

2. A device for setting a spring biased trap as in claim 1 wherein said hollow outer body is made of rectangular tubing.

3. A device for setting a spring biased trap as in claim 1 wherein said hollow outer body is made of round tubing.

4. A device for setting a spring biased trap, said trap having at least one V-shaped spring with first and second retainer rings, said device for setting consisting of:
    an elongate hollow outer body having an open top end and a bottom end, said outer body defining an elongate slot along said outer body, said slot having an upper end closest to said open top end of said outer body and a lower end closest to said bottom end of said outer body;
    a first hook fixedly attached to said outer body in a position toward said bottom end of said outer body and said lower end of said slot, said first hook being open toward said open top of said outer body such that said first hook may engage said first retainer ring;
    a substantially flat setter foot fixedly attached to said bottom end of said hollow outer body and extending perpendicularly out from said hollow outer body;
    an elongate inner plunger having a top and a bottom end, said inner plunger slidably placed in said outer body and extending outward from said top end of said outer body;
    a second hook toward said bottom of said inner plunger, said second hook being fixedly attached to said inner plunger in a position at said bottom end such that said second hook may engage said second retainer ring and slidably engage said elongate slot of said outer body such that said inner plunger is freely slidable between a first position wherein said second hook is at the upper end of said slot and a second position wherein said second hook is at the lower end of said slot, with said second hook being open toward said bottom end; and
    a handle fixedly attached to said top end of said inner plunger.

5. A device for setting a spring biased trap as in claim 4 wherein said hollow outer body is made of rectangular tubing.

6. A device for setting a spring biased trap as in claim 4 wherein said hollow outer body is made of round tubing.

* * * * *